United States Patent
Lee

(10) Patent No.: US 8,845,013 B2
(45) Date of Patent: Sep. 30, 2014

(54) ROLL BLIND APPARATUS USING ROLLER BAR

(71) Applicant: Hyundai Motor Company, Seoul (KR)

(72) Inventor: Ho Ryul Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/689,485

(22) Filed: Nov. 29, 2012

(65) Prior Publication Data

US 2014/0084639 A1    Mar. 27, 2014

(30) Foreign Application Priority Data

Sep. 26, 2012 (KR) .......................... 10-2012-0106977

(51) Int. Cl.
*B60J 3/02* (2006.01)
*B60J 7/043* (2006.01)
*B60J 1/20* (2006.01)
*B60J 7/00* (2006.01)

(52) U.S. Cl.
CPC .............. *B60J 1/2019* (2013.01); *B60J 7/0015* (2013.01)
USPC ....... 296/214; 160/370.22; 160/241; 160/243

(58) Field of Classification Search
USPC ...................... 296/214; 160/241–245, 370.22
See application file for complete search history.

(56) References Cited

U.S. PATENT DOCUMENTS

| | | | |
|---|---|---|---|
| 6,186,587 B1 * | 2/2001 | Entenmann | 296/214 |
| 6,634,703 B1 * | 10/2003 | De Gaillard | 296/214 |
| 7,469,960 B2 * | 12/2008 | Koelbl et al. | 296/214 |
| 8,366,187 B2 * | 2/2013 | Mihashi | 296/214 |

FOREIGN PATENT DOCUMENTS

| | | | |
|---|---|---|---|
| KR | 10-2012-0048093 A | | 5/2012 |
| KR | 10-2012-0054995 A | | 5/2012 |
| KR | 10-2012-0062111 A | | 6/2012 |
| KR | 10-2012-0062955 A | | 6/2012 |

* cited by examiner

*Primary Examiner* — Dennis H Pedder
(74) *Attorney, Agent, or Firm* — Morgan, Lewis & Bockius LLP

(57) ABSTRACT

Provided is a roll blind apparatus using a roller bar, in which only one roll blind is applied to a rear seat so that in roll blind opening, a roll blind for a front seat can be opened, but the roll blind for the rear seat can maintain a closed state, and thus light introduced to the rear seat can be blocked, and by applying a roller function to an existing bar, the roll blind can be wound around the roller bar (mobile roller assembly), thereby solving the headroom shortage problem.

6 Claims, 8 Drawing Sheets

ROLL BLIND APPARATUS USING ROLLER BAR

CROSS-REFERENCE TO RELATED APPLICATION

The present application claims priority of Korean Patent Application Number 10-2012-0106977 filed Sep. 26, 2012, the entire contents of which application is incorporated herein for all purposes by this reference.

BACKGROUND OF INVENTION

1. Field of Invention

The present invention relates to a roll blind apparatus using a roller bar, which can block light only in a rear seat and improve shortage of headroom.

2. Description of Related Art

Recently, a sunroof of a vehicle has been generally installed as a means for achieving internal ventilation while improving the sense of openness. The sunroof is typically manufactured after being thermally processed to endure intense sunlight, and is made of a glass material to effectively block ultraviolet rays and infrared rays.

The sunroof is operated in a partially open manner in which only a rear part is slightly lifted for air circulation in a fully open or partially open state.

In addition, recently, a panoramic roof has won popularity which is made of a glass material over the most area of a roof panel rather than in only a front part of the vehicle to maximize the sense of openness and thus create an atmosphere of convertibles. In other words, the panoramic roof is structured to open the most area of the vehicle roof panel and cover the roof with glass, such that when the glass is opened, the roof is entirely opened to provide a refreshing driving experience.

According to a structure of mechanism, the panoramic roof has an operating scheme in which the glass is opened in a tilted or sliding manner.

FIGS. 1 and 2 are a plane perspective view showing a conventional panoramic sunroof and a perspective view showing an open state of the sun roof, respectively, in which the conventional panoramic sunroof includes a deflector 1, moving glass 2, and fixed glass 3 from front to rear along a longitudinal direction of the body.

In a conventional vehicle type, as shown in FIG. 3, roll blinds are installed on inner ceilings of front seats and rear seats under the moving glass 2 and the fixed glass 3, and the respective roll blinds are connected to a single motor such that the two roll blinds are operated at the same time.

However, when the front moving glass 2 is opened backwardly, the front and rear roll blinds are opened at the same time, such that only the rear roll blind is opened without the rear fixed glass 3 being opened. As a result, a passenger on the rear seat is unintentionally exposed to direct sunlight, causing customer's complaints.

If only one roll blind is received in a rear seat to reduce the cost and weight and improve user convenience, the roll blind has to cover the entire opening which has been covered with the two roll blinds for the front seat and the rear seat, such that the length of the roll blinds increases and thus the outer diameter also increases when the roll blind is opened, further lowering a headlining and causing a problem such as shortage of headroom.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the foregoing problem, and provides a roll blind apparatus using a roller bar, in which only one roll blind is applied to a rear seat, such that in roll blind opening, a roll blind for a front seat is opened, but the roll blind for the rear seat maintains a closed state, and thus light introduced to the rear seat can be blocked, and by applying a roller function to an existing bar, the roll blind can be wound around the roller bar (mobile roller assembly), thus solving the headroom shortage problem.

According to an aspect of the present invention, there is provided a roll blind apparatus using a roller bar to open a roll blind for a front-seat side and block light on a rear-seat side in roll blind opening, the roll blind apparatus including a fixed roller assembly which is installed on a rear-seat side ceiling and around which an end portion of roll blind fabric is wound, a forward/backward moving roller assembly around which the other end portion of the roll blind fabric is wound and which is installed in front of the fixed roller assembly to move forwardly and backwardly, thus opening and closing an opening of the vehicle ceiling, an actuator for supplying power for moving the forward/backward moving roller assembly forwardly and backwardly, and a cable which connects the actuator with both end portions of the forward/backward roller assembly to deliver the power.

The forward/backward moving roller assembly may move backwardly while winding the roll blind fabric therearound by interworking with the fixed roller assembly, to reduce an outer diameter of the fixed roller assembly.

The actuator may include a motor which delivers power by sharing two left and right cables.

The forward/backward roller assembly and the fixed roller assembly may rotate in opposite directions to wind or unwind the roll blind fabric.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
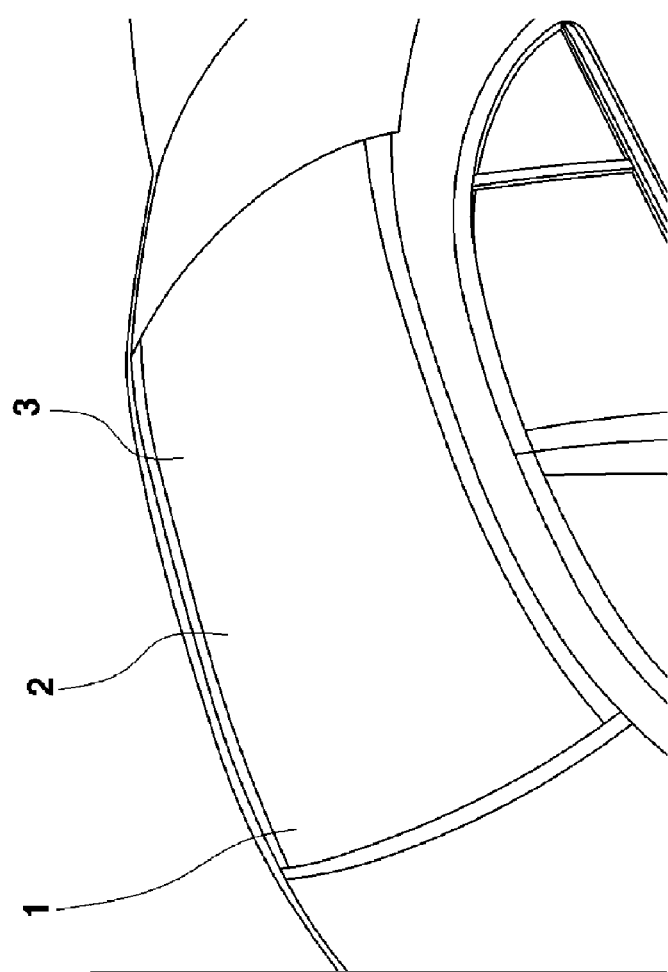
FIG. 1 is a plane perspective view showing a conventional panoramic sunroof
Figure 2:
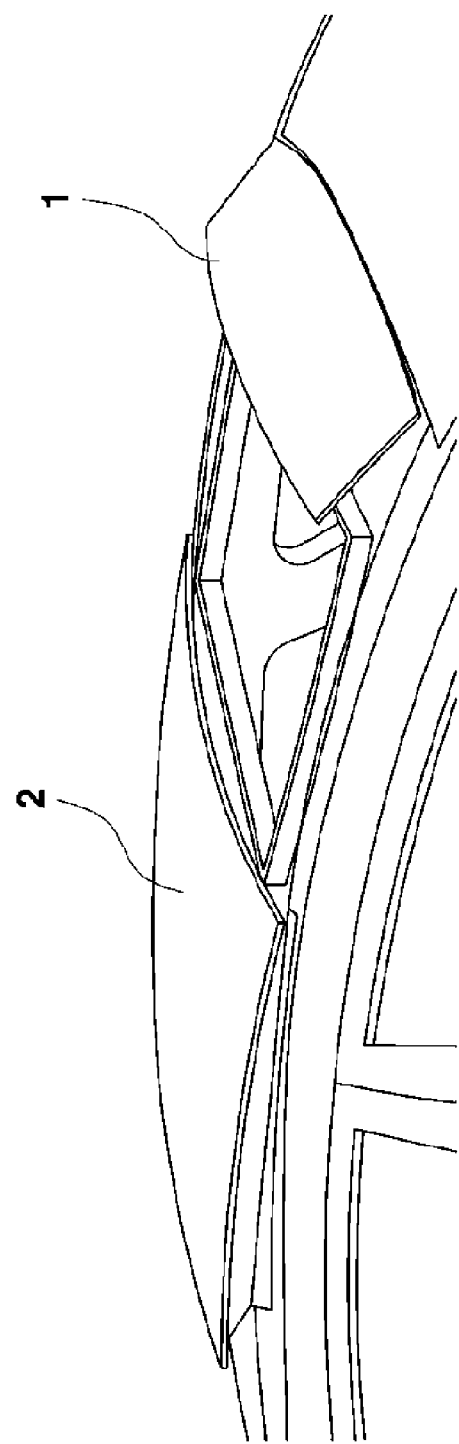
FIG. 2 is a perspective view showing an open state of the panoramic sunroof of FIG. 1.
Figure 3:
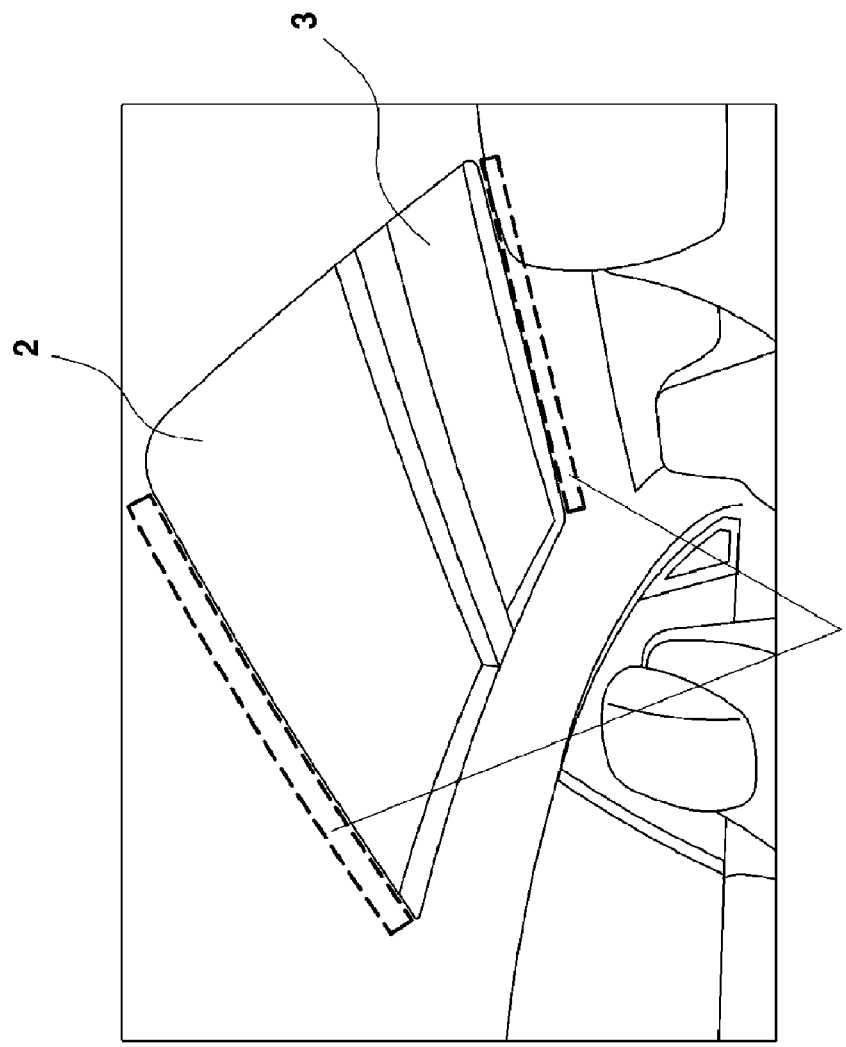
FIG. 3 is a perspective view showing an internal structure of the panoramic sunroof of FIG. 1.
Figure 4:
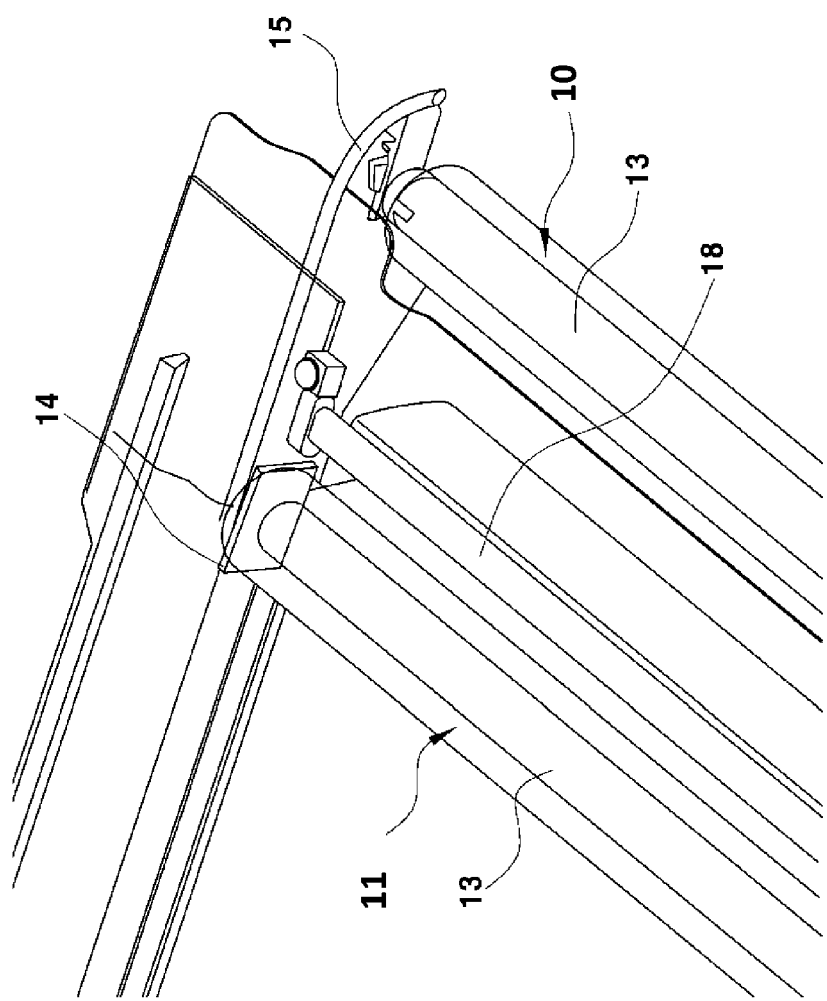
FIG. 4 is a perspective view of an exemplary roll blind apparatus using a roller bar according to the present invention.
Figure 5:
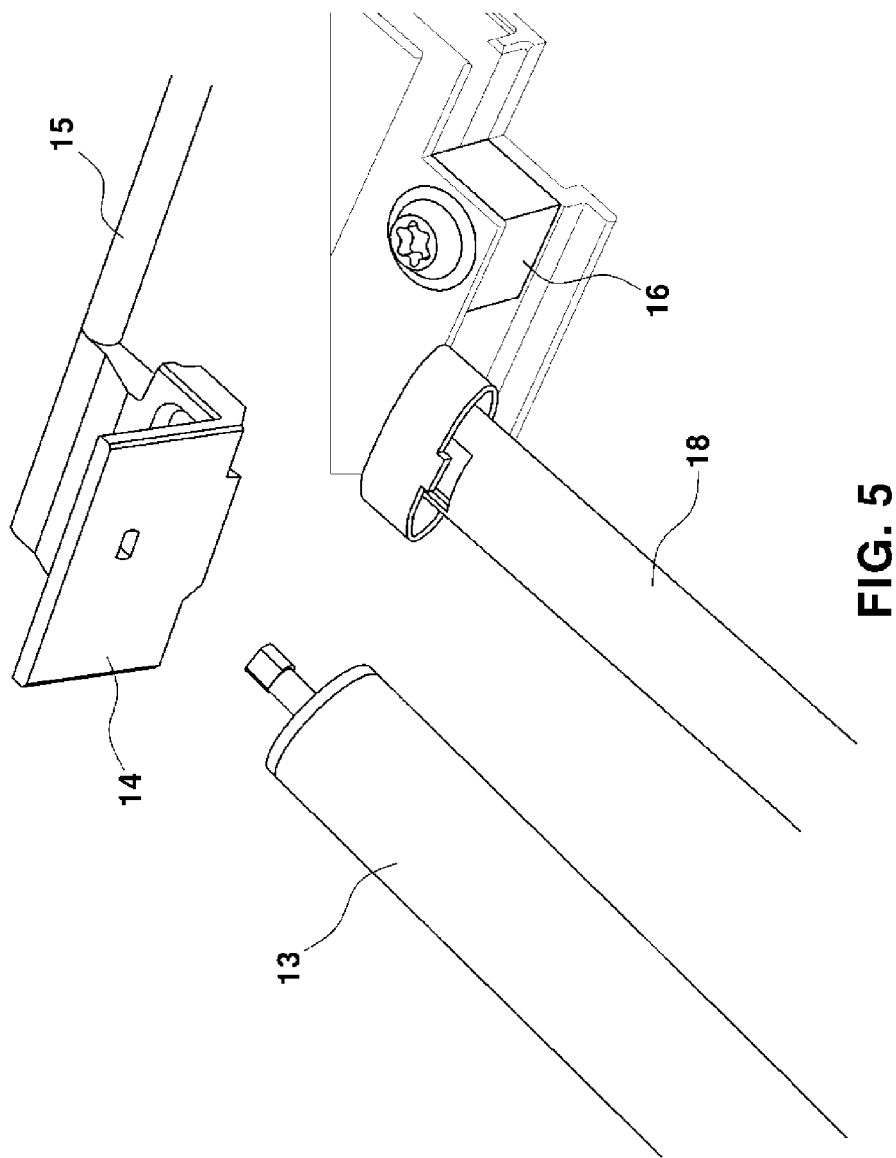
FIG. 5 is a partial enlarged view of FIG. 4.
Figure 6:
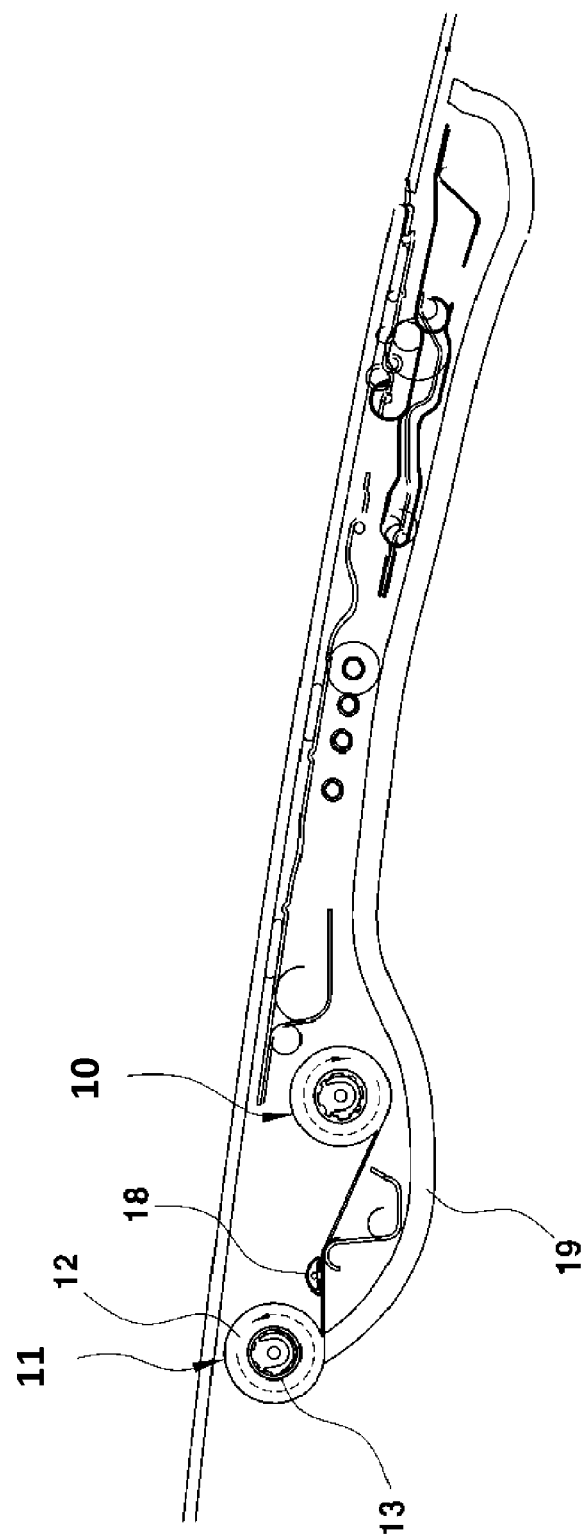
FIG. 6 is a cross-sectional view of FIG. 4.
Figure 7:
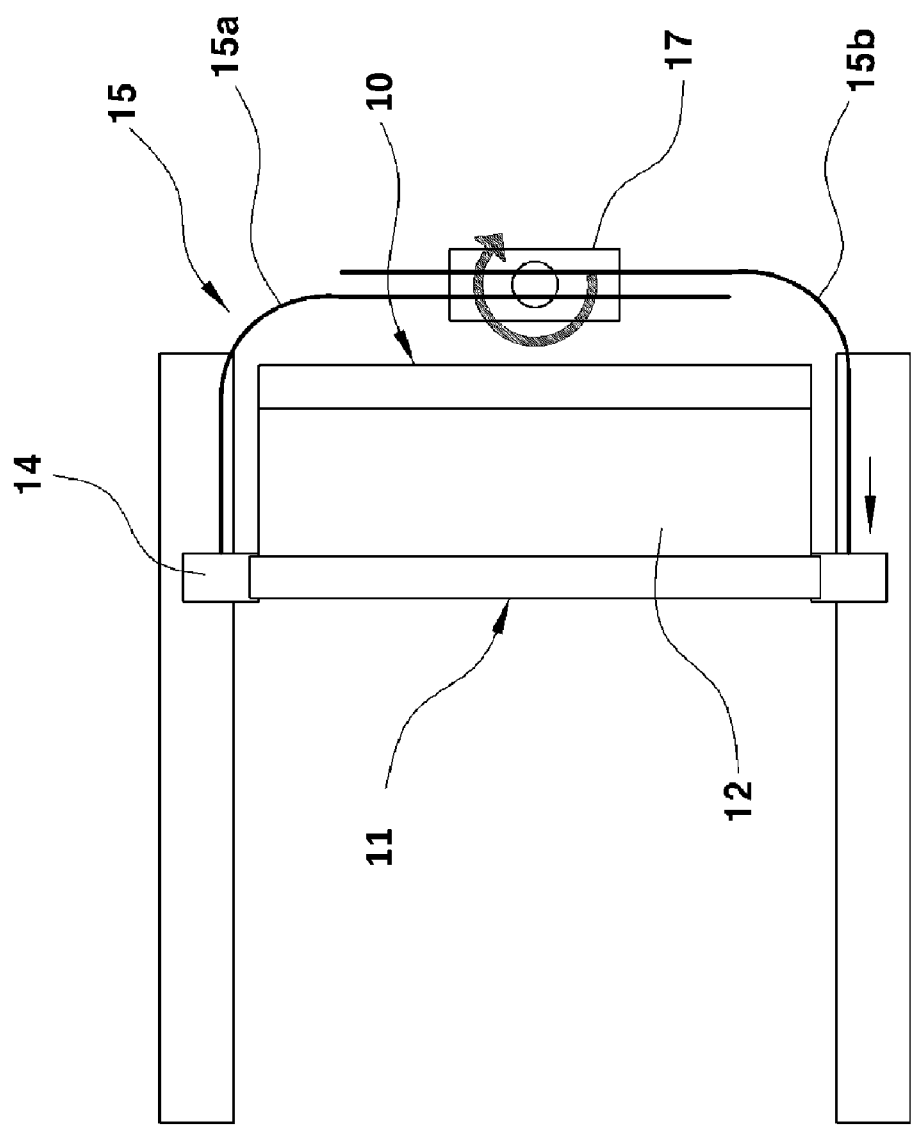
FIG. 7 is a schematic diagram showing components for operating an exemplary roll blind apparatus according to the present invention.
Figure 8:
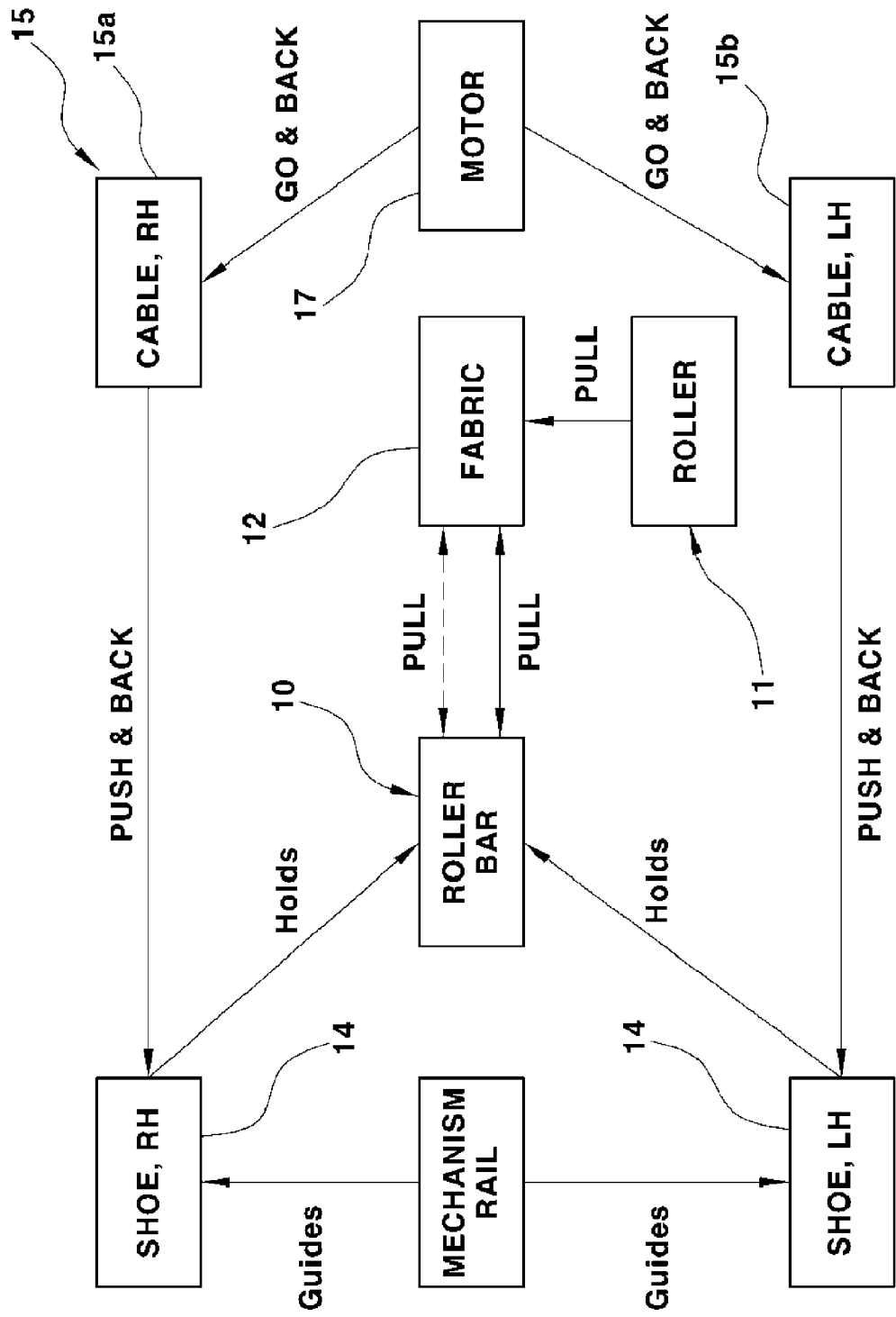
FIG. 8 is a block diagram for describing an operating mechanism of an exemplary roll blind apparatus according to the present invention.

FIG. 4 is a perspective view of a roll blind apparatus using a roller bar according to the present invention; FIG. 5 is a partial enlarged view of FIG. 4; FIG. 6 is a cross-sectional view of FIG. 4; and FIG. 7 is a schematic diagram showing components for operating a roll blind apparatus according to the present invention.

The present invention relates to a roll blind apparatus using a roller bar, which prevents light from being introduced regardless of intention of a passenger on a rear seat and improves the headroom shortage phenomenon due to the increase in the outer diameter of a roll blind when a conventional roll blind is used.

Conventionally, two roll blinds are applied to a front seat and a rear seat, respectively, but in the present invention, to prevent light from being introduced regardless of intention of a passenger on a rear seat in roll blind opening, one roll blind is applied to a rear seat.

In addition, the present invention gives a roller function to an existing bar to solve the headroom shortage phenomenon caused by increase in the outer diameter of the roll blind as one roll blind is applied.

Herein, the roll blind apparatus according to various embodiments of the present invention is installed long in a widthwise direction of the vehicle body on a rear-seat side ceiling, and includes a fixed roller assembly 10 around which roll blind fabric 12 is wound, and a forward/backward roller assembly 11 to which a front end portion of the roll blind fabric 12 is fixed, such that when the roll blind fabric 12 is wound or unwound, the forward/backward roller assembly 11 moves forwardly and backwardly.

The fixed roller assembly 10 and the forward/backward moving roller assembly 11 have the same basic components, except that the fixed roller assembly 10 is fixed to the rear-seat side and the forward/backward moving roller assembly 11 is slidably disposed in front of the fixed roller and thus can move.

For example, each of the fixed roller assembly 10 and the forward/backward moving roller assembly 11 has a roll blind tube 13 in which one end portion of the roll blind fabric 12 is fixed and wound, an end cap installed on both ends of the roll blind tube 13, and a support shaft which is installed in the center portion of the end cap to rotatably support the roll blind tube 13.

The moving roller assembly 11, which is used instead of a conventional bar, is a component made by giving a roller function to the conventional bar.

A spring is installed inside the moving roller assembly 11 to give tension to the roll blind fabric 12 when the roll blind fabric 12 is wound or unwound around the roll blind tube 13, thereby preventing the roll blind fabric 12 from being wrinkled.

A bearing is installed in the support shaft such that the roll blind tube 13 is rotatably supported by the bearing.

Herein, one end portion of the roll blind fabric 12 is fixed to the roll blind tube 13 of the fixed roller assembly 10, and the other end portion thereof is fixed to the roll blind tube 13 of the forward/backward moving roller assembly 11. The both end portions of the roll blind fabric 12 are wound or unwound in opposite directions around the roll blind tube 13 of the fixed roller assembly 10 and the forward/backward moving roller assembly 11.

Consequently, when the forward/backward moving roller assembly 11 moves in a direction away (forwardly) from the fixed roller assembly 10 to close the opening of the vehicle ceiling, the roll blind fabric 12 is unwound from the respective roll blind tubes 13; when the forward/backward moving roller assembly 11 moves in a direction toward (backwardly) the fixed roller assembly 10 to open the opening of the vehicle ceiling, the roll blind fabric 12 is half wound around the respective roll blind tubes 13.

Shoes 14 are installed on both sides of the forward/backward moving roller assembly 11, and each of the left shoe 14 and the right shoe 14 has a circular hole and a square hole formed on a vertical plate of an "L"-shape plate and is connected at an end of a horizontal plate of the "L"-shape plate to the cable 15, such that they can move the forward/backward roller assembly 11 forwardly and backwardly, together with the cable 15.

A blade 18 prevents the roll blind fabric 12 from drooping when the moving roller assembly 11 moves to the farthest position from the fixed roller assembly 10 to close the opening of the vehicle ceiling.

The blade 18 also separates operating positions of the forward/backward moving roller assembly 11 and the fixed roller assembly 10, such that the moving roller assembly 11 does not cross the blade 18 and thus does not meet the fixed roller assembly 10.

When the forward/backward roller assembly 11 moves backwardly toward the fixed roller assembly 10, the blade 18 also moves backwardly. A stopper 16 is installed between the blade 18 and the fixed roller assembly 10 to prevent the blade 18 from colliding with the fixed roller assembly 10.

The shoes 14 are connected with a motor 17 by the cable 15 to urge the forward/backward moving roller assembly 11 to move forwardly and backwardly by means of the motor 17.

The cable 15 includes a first cable 15*a* fixed to a right end portion of the forward/backward roller assembly 11 and a second cable 15*b* fixed to a left end portion of the forward/backward roller assembly 11.

Rear end portions of the first cable 15*a* and the second cable 15*b* are connected to a cable drum while crossing each other, and the cable drum is connected to a rotation shaft of the motor 17 to rotate.

Hereinafter, an operating state of the roll blind apparatus according to the present invention structured as described above will be described in detail.

Once a driver presses an open/close switch to open a panoramic sunroof, power is applied to the motor 17 through an open signal so that the motor 17 can be unidirectionally rotated, the first cable 15*a* and the second cable 15*b* connected to the cable drum move toward the motor 17, the forward/backward moving roller assembly 11 moves backwardly, and thus the roll blind fabric 12 can be wound around the roll blind tubes 13, thereby opening the roll blind.

Herein, if the driver turns off the open/close switch from the on state when the forward/backward moving roller assembly 11 is positioned in the middle between the front seat and the rear seat, then the motor 17 stops operating, such that the roll blind is half opened and a passenger and the driver on the front seats may feel the sense of openness as the moving glass and the roll blind are opened, while on the rear seats, light is blocked by the roll blind and thus the light is prevented from being introduced to the rear seats regardless of intention of a passenger on the rear seat, thereby addressing consumer's complaints.

Moreover, when the roll blind is completely opened, the forward/backward roller assembly 11 moves backwardly and thus the forward/backward roller assembly 11 and the fixed roller assembly 10 simultaneously rotate in opposite directions, thus pulling the roll blind fabric 12, so that the roll blind fabric 12 can be half received in each of the forward/backward moving roller assembly 11 and the fixed roller assembly 10. Consequently, the outer diameter of the roll blind can be reduced and the shortage of the headroom caused by increase in the outer diameter of the roll blind can also be solved.

When the driver presses the open/close switch to close the panoramic sunroof, power is applied to the motor 17 through a close signal so that the motor 17 can be rotated in the opposite direction, the first cable 15a and the second cable 15b connected to the cable drum move away from the motor 17, the forward/backward moving roller assembly 11 move forwardly, and thus the roll blind fabric 12 be unwound from the roll blind tubes 13, thereby closing the roll blind.

Therefore, according to the present invention, when one roll blind is applied to a panoramic sunroof mounted vehicle, owing to reduction in the outer diameter of the roll blind, a conventional headroom can be applied to a sedan-type vehicle having a low ground clearance as well as a sports utility vehicle (SUV) having a high headroom.

The roll blind apparatus using the roller bar according to the present invention may have the following advantages.

First, by installing one roll blind apparatus on a rear-seat side ceiling, the rear portion of the roll blind is maintained closed, and the front portion of the roll blind is maintained opened, that light is prevented from being introduced to the rear seats regardless of intention of the passenger, thus addressing the consumer's complaints.

Second, by applying the forward/backward roller assembly given a roller function instead of a conventional bar, the roll blind is wound around the forward/backward moving roller assembly and the fixed roller assembly when the roll blind is opened, thereby preventing shortage of headroom caused by increase in the outer diameter of the roll blind when one roll blind apparatus is applied.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roll blind apparatus, comprising:
a roller bar to open a roll blind for a front-seat side and block light on a rear-seat side in roll blind opening;
a fixed roller assembly installed on a rear-seat side ceiling and around which an end portion of roll blind fabric is wound;
a forward/backward moving roller assembly around which another end portion of the roll blind fabric is wound and installed in front of the fixed roller assembly to move forwardly and backwardly, thus opening and closing an opening of the vehicle ceiling;
an actuator for supplying power for moving the forward/backward moving roller assembly forwardly and backwardly;
a cable which connects the actuator with both end portions of the forward/backward roller assembly to deliver the power; and
shoes installed on both sides of the forward/backward moving roller assembly and connected with the actuator by the cable to move the forward/backward moving roller assembly forwardly and backwardly;
wherein the cable includes a first cable connecting the shoe installed at a right end portion of the forward/backward roller assembly and a second cable connecting the shoe installed at a left end portion of the forward/backward roller assembly to the actuator; and
wherein the forward/backward moving roller assembly is configured to move backwardly while winding the roll blind fabric therearound by interworking with the fixed roller assembly to reduce an outer diameter of the fixed roller assembly.

2. The roll blind apparatus of claim 1, wherein the actuator comprises a motor which delivers power by sharing two left and right cables.

3. The roll blind apparatus of claim 1, wherein the forward/backward roller assembly and the fixed roller assembly rotate in opposite directions to wind or unwind the roll blind fabric.

4. The roll blind apparatus of claim 1, wherein one or each shoe is formed of an "L" shape plate.

5. The roll blind apparatus of claim 4, wherein the shoe includes a square hole on a vertical plate of the "L" shape plate.

6. The roll blind apparatus of claim 1, further comprising:
a blade separating the forward/backward moving roller assembly from the fixed roller assembly and preventing the roll blind fabric from drooping when the forward/backward moving roller assembly moves to a farthest position from the fixed roller assembly to close the opening of the vehicle ceiling.

* * * * *